(12) United States Patent
Marietta et al.

(10) Patent No.: US 9,152,587 B2
(45) Date of Patent: Oct. 6, 2015

(54) VIRTUALIZED INTERRUPT DELAY MECHANISM

(75) Inventors: Bryan D. Marietta, Cedar Park, TX (US); Gary L. Whisenhunt, Leander, TX (US); Kumar K. Gala, Austin, TX (US); David B. Kramer, Cedar Park, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 523 days.

(21) Appl. No.: 13/485,120

(22) Filed: May 31, 2012

(65) Prior Publication Data

US 2013/0326102 A1 Dec. 5, 2013

(51) Int. Cl.
*G06F 13/24* (2006.01)

(52) U.S. Cl.
CPC .................................. *G06F 13/24* (2013.01)

(58) Field of Classification Search
CPC ............................ G06F 13/24; G06F 11/0712
USPC ................................................ 710/262–263
See application file for complete search history.

(56) References Cited

U.S. PATENT DOCUMENTS

| | | | | |
|---|---|---|---|---|
| 4,133,030 | A * | 1/1979 | Huettner et al. ................... | 710/1 |
| 5,193,187 | A * | 3/1993 | Strout et al. .................... | 710/261 |
| 5,600,805 | A * | 2/1997 | Fredericks et al. ............... | 710/5 |
| 5,659,756 | A | 8/1997 | Hefferon et al. | |
| 6,598,069 | B1 | 7/2003 | Rooney et al. | |
| 6,865,688 | B2 * | 3/2005 | Dawkins et al. ............... | 714/6.1 |
| 7,162,560 | B2 | 1/2007 | Taylor et al. | |
| 7,209,994 | B1 | 4/2007 | Klaiber et al. | |
| 7,272,664 | B2 * | 9/2007 | Arimilli et al. ............... | 709/250 |
| 7,296,133 | B2 * | 11/2007 | Swanberg ..................... | 711/173 |
| 7,302,511 | B2 | 11/2007 | Jeyasingh et al. | |
| 7,533,207 | B2 | 5/2009 | Traut et al. | |
| 7,606,995 | B2 | 10/2009 | Herrell et al. | |
| 7,617,340 | B2 | 11/2009 | Gregg | |
| 7,660,912 | B2 | 2/2010 | Gregg | |
| 7,689,747 | B2 * | 3/2010 | Vega et al. .................... | 710/261 |
| 7,752,378 | B2 | 7/2010 | Fukumura et al. | |
| 7,818,751 | B2 * | 10/2010 | Togawa ........................ | 718/108 |
| 7,835,356 | B2 | 11/2010 | Bar-Kovetz et al. | |
| 7,849,247 | B2 | 12/2010 | Marietta et al. | |
| 7,849,327 | B2 | 12/2010 | Leung et al. | |
| 7,912,062 | B2 | 3/2011 | Gulati et al. | |
| 7,987,464 | B2 * | 7/2011 | Day et al. ...................... | 718/104 |
| 8,041,920 | B2 | 10/2011 | Konfaty et al. | |
| 8,108,736 | B2 | 1/2012 | Uchibori | |

(Continued)

OTHER PUBLICATIONS

Freescale Semiconductor, Inc., EREF 2.0: A Programmer's Reference Manual for Freescale Power Architecture® Processors, Rev. 0, Sep. 2011.

*Primary Examiner* — Paul R Myers
(74) *Attorney, Agent, or Firm* — Terrile, Cannatti, Chambers & Holland, LLP; Michael Rocco Cannatti

(57) ABSTRACT

A method and circuit for a data processing system provide a partitioned interrupt controller with an efficient deferral mechanism for processing partitioned interrupt requests by executing a control instruction to encode and store a delay command (e.g., DEFER or SUSPEND) in a data payload with a hardware-inserted partition attribute (LPID) for storage to a command register (25) at a physical address (PA) retrieved from a special purpose register (46) so that the partitioned interrupt controller (14) can determine if the delay command can be performed based on local access control information.

21 Claims, 4 Drawing Sheets

(56) References Cited

U.S. PATENT DOCUMENTS

| | | |
|---|---|---|
| 8,131,901 B2 * | 3/2012 | Mansell et al. ............... 710/260 |
| 8,175,271 B2 | 5/2012 | Belgaied et al. |
| 8,176,487 B2 * | 5/2012 | Armstrong et al. ............... 718/1 |
| 8,281,315 B2 | 10/2012 | Ault et al. |
| 8,453,143 B2 | 5/2013 | Mahalingham et al. |
| 8,489,789 B2 | 7/2013 | Serebrin et al. |
| 8,560,782 B2 | 10/2013 | Marietta et al. |
| 8,589,934 B2 | 11/2013 | Makljenovic et al. |
| 8,782,314 B2 | 7/2014 | Kothari et al. |
| 2003/0061423 A1 | 3/2003 | Rankin et al. |
| 2003/0115443 A1 * | 6/2003 | Cepulis et al. .................... 713/2 |
| 2004/0205272 A1 | 10/2004 | Armstrong et al. |
| 2004/0215860 A1 | 10/2004 | Armstrong et al. |
| 2006/0212642 A1 | 9/2006 | Takahashi et al. |
| 2007/0208885 A1 | 9/2007 | Otsuka |
| 2008/0126652 A1 | 5/2008 | Vembu et al. |
| 2008/0141277 A1 * | 6/2008 | Traut et al. .................... 719/313 |
| 2008/0162734 A1 | 7/2008 | Uehara et al. |
| 2008/0209182 A1 | 8/2008 | Snyder et al. |
| 2008/0267193 A1 | 10/2008 | Fought et al. |
| 2008/0320194 A1 * | 12/2008 | Vega et al. .................... 710/263 |
| 2008/0320272 A1 | 12/2008 | Fukumura et al. |
| 2009/0282211 A1 | 11/2009 | Hoover et al. |
| 2010/0095039 A1 | 4/2010 | Marietta et al. |
| 2010/0146344 A1 | 6/2010 | Uchibori |
| 2011/0072220 A1 | 3/2011 | Marietta et al. |
| 2012/0159245 A1 | 6/2012 | Brownlow |
| 2014/0047149 A1 | 2/2014 | Marietta et al. |
| 2014/0047150 A1 | 2/2014 | Marietta et al. |

\* cited by examiner

VIRTUALIZED INTERRUPT DELAY MECHANISM

BACKGROUND OF THE INVENTION

1. Field of the Invention

The present invention is directed in general to data processing systems. In one aspect, the present invention relates to system resource management in a data processing system that employs more than one partition.

2. Description of the Related Art

In data processing systems, the physical or hardware resources may be divided into resource subsets or logical partitions which virtually operate as a separate computer, where each partition typically contains a processor core and other specified resources or specified portions of a resource such as memory within the system. Existing partitioning strategies of replicating all the required hardware on a per-processor basis does not scale past a small number of multi-threaded processors because of the increased requirements for die area, wiring, and system memory, as well as the attendant system memory management issues. However, there are challenges presented with managing and processing interrupt requests. Accordingly, a need exists for an improved system and methodology for managing system resources in a partitioned data processing system that address various problems in the art where various limitations and disadvantages of conventional solutions and technologies will become apparent to one of skill in the art after reviewing the remainder of the present application with reference to the drawings and detailed description which follow, though it should be understood that this description of the related art section is not intended to serve as an admission that the described subject matter is prior art.

BRIEF DESCRIPTION OF THE DRAWINGS

The present invention may be understood, and its numerous objects, features and advantages obtained, when the following detailed description of a preferred embodiment is considered in conjunction with the following drawings, in which.

DETAILED DESCRIPTION

Figure 1:
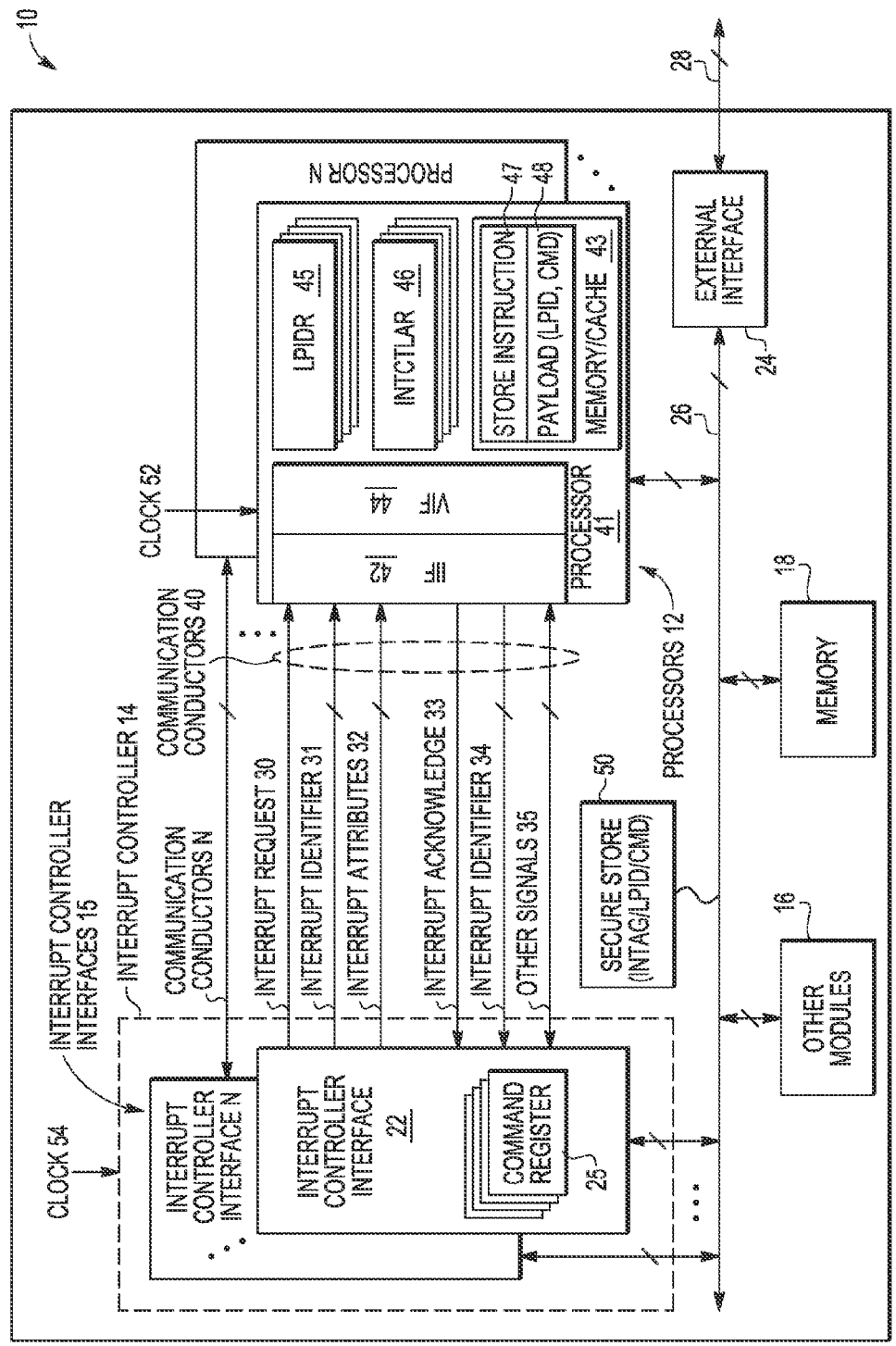
FIG. 1 is a simplified block diagram of a system for securely managing interrupt requests with a hardware managed interrupt service structure wherein interrupt request processing may be deferred or suspended with a partitioned instruction which encodes the data payload of a specialized store operation with an access command and hardware-inserted partition identifier in accordance with selected embodiments of the present invention.

A system, apparatus, and methodology are described for securely managing partitioned interrupt requests with a hardware managed interrupt service structure and programming model wherein interrupt request processing may be deferred or suspended using one or more partitioned interrupt control instructions in a data processing system. In order to independently manage the timing and processing of partitioned interrupts, an interrupt controller architecture includes one or more partitioned delay commands which may be issued to a partitioned interrupt controller by a processor core or other interrupt management device to indicate that processing of an associated interrupt will be deferred and/or suspended. In selected embodiments, the delay commands are securely issued by providing an instruction set architecture with a processor executable interrupt control instruction which performs a specialized store operation to a command register at the partitioned interrupt controller having a predetermined address under control of trusted software which encodes a data payload of the store operation with a hardware-inserted partition identifier (e.g., a Logical Partition Identifier, or LPID) and command to notify the interrupt controller that the current highest priority interrupt will be processed at a later time. In selected embodiments, the delay command may be implemented as a "DEFER" command that is used by a guest OS to manage interrupts by notifying the interrupt controller that the current highest priority interrupt will be processed at a later time. By adding a "deferred" state to the interrupt controller, the target processor may send a hardware-inserted partition identifier (e.g., a Logical Partition Identifier, or LPID) and interrupt identifier with the partitioned command to instruct the interrupt controller to leave all of the interrupt controller information on the identified interrupt intact and to take the identified interrupt out of the presentation arbitration decision, thereby allowing other, lower priority, interrupts to be presented for servicing. In other embodiments, the delay command may be implemented as one or more "SUSPEND" commands that are used by a hypervisor OS to freeze or suspend the state of the interrupt system for a partition that is being made inactive. By adding "suspended" states to the interrupt controller, the target processor may send partitioned commands with a hardware-inserted partition identifier and interrupt identifier to instruct the interrupt controller to suspend an interrupt in the idle, in-service, and deferred states (the pending and asserted states are transitory and resolve into one of the other states). In similar fashion, a partitioned "DEFER_ALL" command or "SUSPEND_ALL" command allows all interrupts for a specified partition and priority level to be delayed by the guest OS or hypervisor, respectively. When the target processor decides to service the delayed interrupt(s), a partitioned command and interrupt identifier may be sent to the interrupt controller with an "ACTIVATE" command or "RESUME" command to re-enable the interrupt (s) for presentation.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the circuit designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in simplified schematic diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

With existing data processing systems, the partitioning of physical or hardware resources presents a number of challenges when processing interrupt requests, such as interrupt requests targeted for a partition not currently in execution or interrupt requests that are not currently selected by the presentation arbitration for processing by the processor. For example, with interrupt controllers which present only the highest priority outstanding interrupt to a processor core for servicing, the processor core must accept the highest priority interrupt from the interrupt controller in order to see other interrupts. If the service routine wishes to ignore a presented interrupt and select a different priority interrupt for processing, the selection of the new interrupt must be managed completely though software, which adds overhead and complexity that can adversely affect system performance. The additional overhead and complexity is especially significant in a partitioned machine when the delivered interrupt is targeted to a partition that is not currently in execution. To reduce the software overhead and complexity for interrupt management and/or partition management, selected embodiments are disclosed to provide an efficient delay mechanism for delaying interrupt acceptance by the targeted processor.

To illustrate selected embodiments, reference is now made to FIG. 1 which depicts a simplified block diagram of a data processing system 10 for securely accessing partitioned resources 14 with partitioned instructions which encode the data payload of a specialized store operation with an access command and a hardware-inserted partition identifier. The depicted data processing system 10 includes one of more processors 12 connected to an interrupt controller 14 over a plurality of communication conductors 40. In addition, an interconnect circuit or bus 26 provides a memory-mapped interface for connecting the processor(s) to the interrupt controller 14, one or more other modules 16, one or more memories 18, and external interfaces 24. Clock signals 54, 52 are provided, respectively, to the interrupt controller 14 and processor 41 which may have either an arbitrary phase and frequency relationship, or a known or predetermined relationship, with one another. Though illustrated as being formed on a single integrated circuit, the data processing system 10 may be provided on a plurality of integrated circuits.

In the data processing system 10, the processor(s) 12 include N processors (including processor 41 and processor N) that are directly connected over N communication conductors (including communication conductors 40) to N interrupt controller interfaces 15 (including interrupt controller interface 22) in the interrupt controller 14, where N is an integer greater than or equal to one. In embodiments where the data processing system 10 is partitioned, different physical hardware resources (e.g., processors, controllers, and memory) are grouped together in a "partition" to perform a specified function (such as executing an operating system). In embodiments where the data processing system 10 supports virtualization, one or more of the hardware resources may be emulated or abstracted with a software implementation that is executed to behave like the emulated hardware resource. For example, in embodiments where the processor N implements multithreading, each hardware thread having a thread private architecture state may be considered to be a virtual processor N. Using virtualization, the data processing system 10 can be organized into one or more logical partitions to represent a collection of actual or emulated hardware resources so that a single virtual computing machine runs on a single logical partition. Within each logical partition, there may be a shared or private memory, one or more processors and a collection of accelerators and I/O devices. Each of these resources, including the processors, may be actual dedicated hardware or may be implemented by partially or completely virtualized hardware.

As shown in FIG. 1, each of the N interrupt controller interfaces 15 is coupled to a corresponding one of the processors 12 by way of one or more communication conductors (e.g., communication conductor 40). In addition, both the processor(s) 12 and N interrupt controller interfaces 15 are bi-directionally coupled to the bus 26. As for the other modules 16, these may include any type of circuitry, such as, for example, timers, drivers, communication ports, etc. Similarly, memory 18 may include any type of memory, such as, for example, random access memory, read only memory, various types of non-volatile memory, etc. Finally, the external interfaces 24 connects the bus 26 to one or more external interrupt sources by way of one or more terminals or conductors 28.

The depicted communication conductors 40 include an interrupt request indicator 30, an interrupt identifier 31, and an interrupt attributes indicator 32 which are provided by the interrupt controller interface 22 to processor 41. In addition, the depicted communication conductors 40 include an interrupt acknowledge 33 and interrupt identifier 34. The communication conductors 40 may also include one or more other signals 35 which may be bidirectional, which may be uni-directional from interrupt controller interface 22 to processor 41, or which may be uni-directional from processor 41 to interrupt controller interface 22. As will be appreciated, the signaling information provided by conductors 30-32 may be provided by way of any one or more separate or shared conductors, and the information provided by conductors 33-34 may be provided by way of any one or more separate or shared conductors.

In operation, the interrupt controller 14 provides an interrupt request 30 along with a corresponding interrupt identifier 31 and corresponding interrupt attributes 32 to a processor 41. Sorting circuitry (not shown) at the interrupt controller 14 sorts the pending interrupt requests for a particular target processor so that only the top or highest priority interrupt request 30 is presented or asserted to the target processor. Upon accepting the interrupt, the processor 41 returns an interrupt acknowledge 33 to the interrupt controller 14, along with the same interrupt identifier 34. In addition, the processor typically issues one or more additional access requests relating to the accepted interrupt (e.g., end-of-interrupt commands) which must be handled by the interrupt controller 14. While additional interrupt-related access requests by the processor 41 could be conveyed directly to the interrupt controller 14 over conductors 33-35, such sideband communications present challenges with maintaining transaction ordering unless they are handled by additional, inure expensive, methods. However, sideband communication paths can be used with other types of system resources.

To support virtualized interrupt processing, the processor 41 includes an interrupt interface (HF) 42 whereby a global interrupt controller (interrupt controller 14) communicates with the processor 41 which may be a virtual processor or an actual, physical processor. In addition, a virtualized interface (VIF) 44 is provided as a hardware and/or software interface between the (virtual) processor and HF 42. The interrupt interface 42 coordinates interrupt processing between the (virtual) processor 41 and the interrupt controller 14. With this arrangement, when the interrupt controller 14 sends the highest priority interrupt for a (virtual) processor, the VIF 44 conveys the interrupt to the (virtual) processor which decides whether to take the interrupt. With virtualized interrupts, the processor 41 can begin servicing the interrupt without having to perform memory mapped operations (e.g., over the interconnect circuit or bus 26) to the interrupt controller 14, thereby reducing overhead and latency. Interrupt virtualization also allows interrupts to be targeted to the guest OS currently in execution, the hypervisor, or any guest OSes currently bound to the (virtual) processor which are not currently in execution.

In order to securely process virtualized interrupt requests, the instruction set architecture for the processor 41 includes a special processor executable instruction 47 that may be retrieved from memory (e.g., memory 18) or local processor storage 43 (e.g., cache memory. EEPROM, flash memory, ROM, MRAM, etc.) and executed to construct a data payload portion 48 using information stored in one or more storage registers, memory, or local processor storage. The processor 41 uses the control instruction 47 and associated data payload 48 to handle one or more states for the virtualized interrupts to perform runtime interrupt management (e.g., standard runtime operations associated with interrupts for hypervisors, guests in execution, and guests not in execution) with minimal memory mapped interactions with a global interrupt controller, reducing overhead and latency. For example, a received interrupt request has certain information associated with it at the processor(s) 41 and interrupt controller 14 which may be defined by software during configuration of interrupts and/or by the hardware and used to process the interrupt request. The associated information may include a hypervisor configured logical partition ID (LPID) value associated with the interrupt that is conveyed with the interrupt identifier 31. At the processor 41, the LPID received with the interrupt is compared to the LPIDR register 45 to determine whether this is a hypervisor interrupt, a guest in execution interrupt, or a guest not in execution interrupt.

With the processor executable interrupt control instruction 47 and associated data payload 48, access requests to a partitioned interrupt controller are efficiently conveyed to the partitioned resource (e.g., interrupt controller 14) by performing a specialized store 50 of the data payload 48 to a predetermined address at the partitioned resource to thereby store a hardware-inserted LPID value and associated command (CMD) to be performed by the partitioned resource. To secure the partitioned access request, the execution of the interrupt control instruction 47 is managed by trusted software which uses values stored in dedicated registers at the processor 41. In particular, the processor 41 retrieves the LPID value from the e LPIDR register 45 and encodes the retrieved LPID value—along with a command value (CMD)—into the data payload 48 of the store operation. An interrupt identifier or tag associated with the interrupt (e.g., INTTAG) may also be retrieved from a special purpose register (not shown) and encoded in the data payload 48 under control of the interrupt control instruction 47 for use in uniquely identifying the targeted interrupt in the interrupt controller 14. In addition, the processor retrieves from the dedicated address register or interrupt control address (INTCTLAR) register 46 the real or physical address of the command register for the store operation specified by the interrupt control instruction 47, where the address is stored in the dedicated address register or otherwise derived by the hypervisor. Finally, the processor completes the execution of the interrupt control instruction 47 by performing a secure store operation 50 of the data payload 48 over the bus 26 to the command register 25 of the interrupt controller 14 using the physical address stored in the interrupt control address (INTCTLAR) register 46, where the store operation stores a data payload which includes the LPID value and the associated command (CMD). By controlling access to the special purpose registers (SPRs) 45-46 with trusted higher-level software (e.g., the hypervisor), the physical address and LPID assigned to the access are prevented from being controlled by a requesting program.

In addition, the data payload may be encoded with any desired interrupt controller command to perform operations in the interrupt controller 14 in a virtualized and partitioned manner. For example, the interrupt control instruction allows software (both guest and hypervisor) to encode LRID and command values to denote that interrupt processing has completed for an interrupt (e.g., an EOI notification), thereby changing the interrupt state from "in-service" to "idle." In other embodiments, the interrupt control instruction allows software to encode LPID and command values which delay, defer or suspend processing of an identified interrupt, thereby changing the interrupt state at the interrupt controller to "deferred" or "suspended." The interrupt control instruction also allows software to encode LPID and command values to activate or resume processing of a delayed interrupt. In addition, the hypervisor can use the interrupt control instruction to "defer all" or "suspend all" interrupts associated with a (virtual) processor and an LPID value based on priority level, and to "activate all" or "resume all" interrupts associated with a (virtual) processor and an LPID value that were previously delayed (e.g., deferred or suspended). As will be appreciated, these are example interrupt states, and an interrupt can be transferred to other states (e.g., "suspended-in-service," "suspended-deferred," and "suspended," etc.) by the interrupt control instruction. In operation, the interrupt control instruction causes the processor 41 to perform a store to the real address of the command register 25 at the resource associated with the (virtual) processor (e.g., interrupt controller 14). Using the real address stored in the INTCTLAR 46, the interrupt control instruction takes the data specified by the contents of a specified source register, merges in the LPID value from the LPIDR register 45 and masks off certain commands based on guest or hypervisor state before writing the result to the command register 25 identified by the real address stored in the INTCTLAR 46. By making the LPIDR 45 and INTCTLAR hypervisor-privilege registers, the LPID and physical address, and to some extent the command assigned to the access, cannot be controlled by the requesting program. The ability of the interrupt control instruction to implement hardware masking of a command bit provides an enforcement mechanism for selected hypervisor-only commands (e.g., the "defer all" and "activate all" commands).

In addition to specifying information for access requests to the interrupt controller 14, the SPRs 45-46 may also be used to process requests received from the interrupt controller 14. For example, when the LPID value associated with the requested interrupt 30 is equal to the contents of the LPIDR register 45, the processor 41 takes the interrupt as a guest OS interrupt for the current partition in execution. But in cases where the LPID value associated with the interrupt is not equal to the contents of the LPIDR register 45, the requested interrupt 30 is processed as a guest OS interrupt for a partition that is bound to the (virtual) processor 41, but that is not in execution. In addition, the requested interrupt 30 may be a hypervisor interrupt which is not associated directly with a partition.

The (virtual) processor 41 can also execute the interrupt control instruction to use the information stored in the SPRs 45-46 to notify the interrupt controller 14 that the processor 41 will delay the processing of an interrupt until a later time. For example, a currently executing guest OS may manage processing of its own interrupts with a "defer" operation which places the interrupt in a deferred state in the interrupt controller. The "defer" operation may also be used by the hypervisor for its own interrupts. In either case, the "defer" operation may be implemented with a defer interrupt control instruction which encodes the data payload of the specialized store operation with the LPID value and a DEFER command. The data payload is then written as a memory-mapped secure store operation 50 over the bus 26 to the command register 25 specified by the address contained in the INTCTLAR 46. With this information stored in the command register 25, the interrupt controller 14 is notified that the processor 41 will defer the interrupt identified by INTTAG and qualified by LPID to be processed at a later time. As a result, the interrupt controller 14 places the identified interrupt in a deferred state, but leaves intact all of the interrupt controller information on the identified interrupt. In addition, the interrupt controller 14 takes the deferred interrupt out of the arbitration decision so that it does not assert itself in the priority scheme, but allows other interrupts to be presented for servicing. In addition, the storage of the LPID value with the DEFER command enables the interrupt controller 14 to authenticate the guest's DEFER command to enforce partitioning, though the DEFER command can also be used by a hypervisor on behalf of a guest. When the (virtual) processor 41 decides to service the deferred interrupt, the interrupt control instruction may be used to send a partitioned ACTIVATE command using the interrupt tag to re-enable the interrupt for presentation by taking the interrupt out of the deferred state such that it is eligible to assert itself in the priority scheme.

In selected embodiments, the interrupt control instruction may be used by the guest OS to defer all interrupts for a given partition that are less than or equal to a given priority. With the DEFER_ALL interrupt command, the processor 41 sends a memory mapped write of the LPID, INTTAG, and DEFER_ALL command to the command register 25 specified by the address in the INTCTLAR register 46. With this information stored in the command register 25, the interrupt controller 14 removes from their current state all interrupts with a priority level equal or lower than a specified priority level (PRILEVEL) which have a matching LPID. In addition, the interrupt controller 14 transitions the state of these interrupts to a "deferred" state. If the supplied LPID is 0, then the LPID match is ignored and all interrupts with a priority level equal to lower than PRILEVEL are deferred. As will be appreciated, the DEFER and ACTIVATE commands can be targeted for a particular processor using the interrupt control instruction, and other optimizations may be implemented using the virtualized interrupt delay mechanism described herein.

The interrupt control instruction may be used by the (virtual) processor 41 to activate all deferred interrupts for a given partition or to a specific interrupt target. With the "activate_all" interrupt operation, the processor 41 sends a memory mapped write of the LPID, INTTAG, and ACTIVATE_ALL command to the command register 25 specified by the address in the INTCTLAR register 46. With this information stored in the command register 25, all interrupts with a matching LPID are taken out of the "deferred" state by the interrupt controller 14, and their state is transitioned to the "idle" state. If the interrupt is not in the "deferred" state, the command is ignored by the interrupt controller 14. If the supplied LPID is 0, the LPID match is ignored and all interrupts are activated.

As described herein, the partitioned "defer" and "activate" commands effectively provide an interrupt mask function using commands that are authenticated with the LPID value. In addition, the (virtual) processor 41 can use the "defer" and "activate" commands to force an interrupt to be "retried" without changing its interrupt state by sending the interrupt from an "in-service" state back to an "idle" state so that the (virtual) processor can immediately restart processing the interrupt, sequence if it is still active, thereby avoiding the requirement that the processor accept the interrupt immediately.

In similar fashion, the hypervisor OS may manage interrupt processing of its own interrupts (or the blocking of interrupts of a guest OS which is not in execution) with a "suspend" operation to "freeze" the state of the interrupt system for a partition that is being made inactive. Practically, the "suspend" and "defer" operations are similar, except that a deferred interrupt may be suspended. In selected example embodiments, the "suspend" operation may be implemented by executing a suspend interrupt control instruction to encode the data payload of the specialized store operation with the LPID value and a SUSPEND command. The processor 41 sends a memory mapped write operation 50 of the LPID, INTTAG, and SUSPEND command to the command register 25 specified by the address in the INTCTLAR register 46. With this information stored in the command register 25, the interrupt controller 14 is notified that the processor 41 will suspend or freeze the state of the interrupt identified by INTTAG and qualified by LPID. Depending on the current state of the identified interrupt, the interrupt controller 14 places the identified interrupt in a suspended state, but leaves all of the interrupt controller information on the interrupt intact. For example, an interrupt can be suspended in the idle, in-service, and deferred state, where the pending and asserted states are transitory and resolve into one of the other states. Upon receiving a partitioned SUSPEND command, the interrupt controller 14 takes the suspended interrupt out of the arbitration decision so that it does not assert itself in the priority scheme, but allows other interrupts to be presented for servicing. When the (virtual) processor 41 decides to service the suspended interrupt, the interrupt control instruction may be used to send a partitioned RESUME command using the interrupt tag to re-enable the interrupt for presentation by taking the interrupt out of the suspended state such that it is eligible to assert itself in the priority scheme. In addition, a SUSPEND_ALL command allows processing of all interrupts for a specified partition and priority level to be delayed by the hypervisor. A RESUME_ALL command allows all interrupts for a specified partition and priority level to be activated.

Once the processing of the requested interrupt is completed, the (virtual) processor 41 may execute the interrupt control instruction to perform an EOI (end-of-interrupt) operation on the interrupt. The EOI operation is executed by encoding the data payload of the specialized store operation with the interrupt tag, LPID value, and an EOI command. The data payload is then written as a memory-mapped secure store operation 50 over the bus 26 to the command register 25 specified by the address contained in the interrupt control address (INTCTLAR) register 46. With this approach, EOI operations on interrupts are not required to be stacked since they are tagged, thereby eliminating the need for synchronization between the act of taking an interrupt and performing the EOI operation on another interrupt which exists. The interrupt controller 14 uses the partition attribute (LPID) to determine if operation is allowed based on its local access control information.

Figure 2:
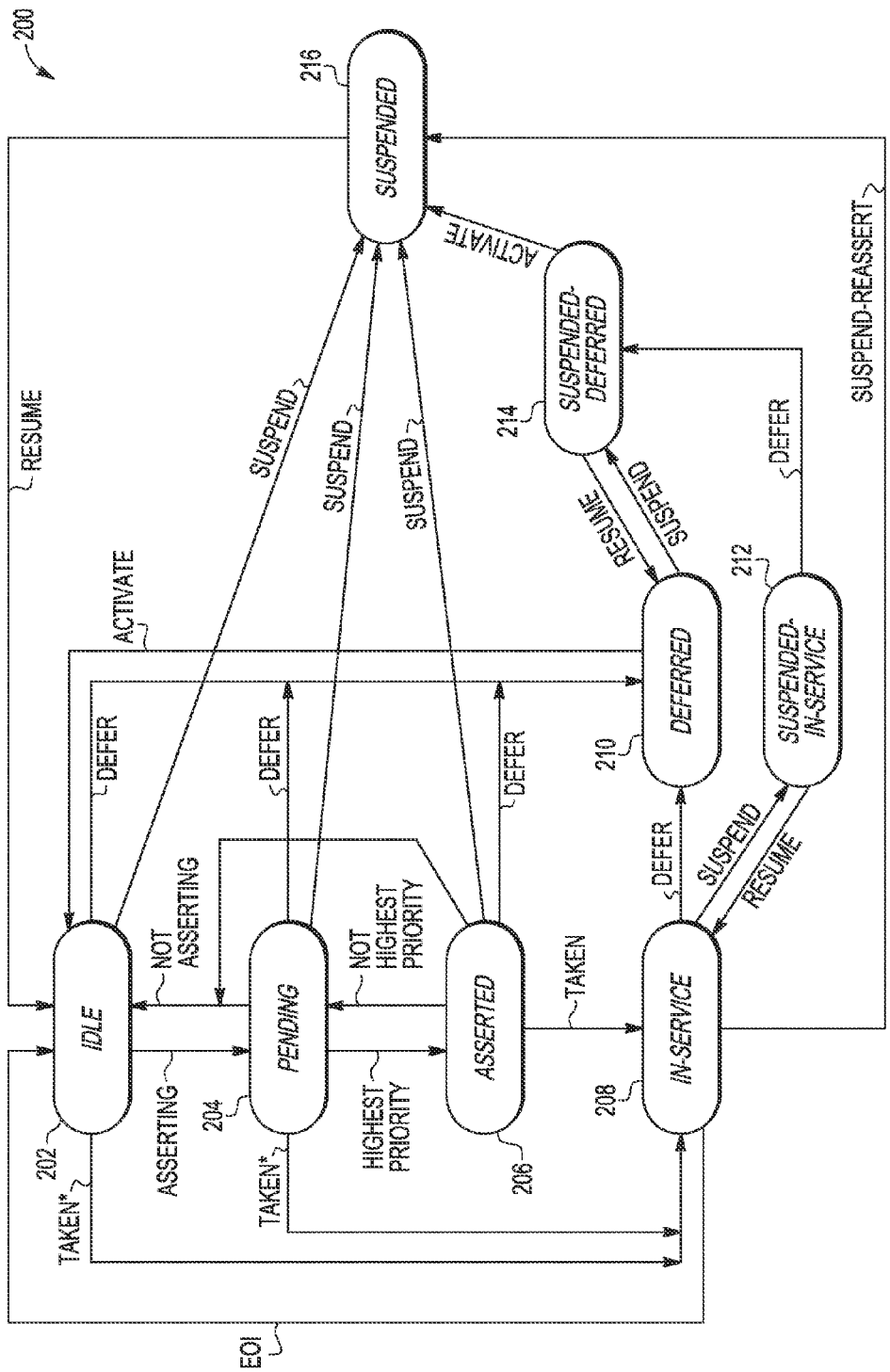
FIG. 2 is a state diagram illustrating the handling of an interrupt request in accordance with selected embodiments of the present invention.

To illustrate how the interrupt control instruction may be used to handle interrupt requests, reference is now made to FIG. 2 which depicts a state diagram of the different interrupt states in accordance with an example core programming model interface for processing interrupts that may be presented by actual physical hardware or virtualized hardware. With the depicted programming model interface, interrupt virtualization is provided to allow interrupts targeted to the guest OS currently in execution, the hypervisor, and any guest OSes currently bound to the processor which are not currently in execution.

In an initial "idle" state 202, the interrupt is idle and is not currently asserting. Once the source of an interrupt has requested an interrupt, the interrupt moves to the "pending" state 204 over the "asserting" transition. In the "pending" state 204, the interrupt is processed at the global interrupt controller and contends with all other interrupts bound to the same (virtual) processor to be selected as the highest priority interrupt. Conversely, once the interrupt is no longer asserting (e.g., when the source of the interrupt has withdrawn its request for an interrupt), the interrupt state returns to the "idle" state 202 over the "not asserting" transition.

If the interrupt has the highest priority, it moves to the "asserted" state 206 over the "highest priority" transition. At the "asserted" state 206, the interrupt is sent from the global interrupt controller to the processor as the current highest priority interrupt. Conversely, once the interrupt is no longer the highest priority asserting interrupt at the (virtual) processor, the interrupt state returns to the "pending" state 204 over the "not highest priority" transition. If the interrupt is no longer asserting because the interrupt request was withdrawn the interrupt state returns to the "idle" state 202 over the "not asserting" transition.

Once the processor takes the asserted interrupt, the interrupt enters the "in-service" state 208 over the "taken" transition. As indicated with the "taken *" transition, the processor may also take interrupts from the idle state 202 or pending state 204 in situations where state transitions that occur due to the latency of communication between the global interrupt controller and the processor interface. For example, the "taken *" transition can occur when an interrupt is withdrawn after being in the asserted state and a "cancel" command from the interrupt controller does not arrive in time to prevent the target processor from taking the interrupt.

During the "in-service" state 208, the processor begins executing the external interrupt, and information about the interrupt is used to determine whether the interrupt is taken in the guest state or the hypervisor state. At this point, the processor may update one or more special purpose registers with tag and attribute information for the interrupt.

In accordance with selected embodiments, the processor may use the interrupt control instruction at any time to delay acceptance of an interrupt request by moving the interrupt to a "deferred" state 210 from any of the "idle," "pending," "asserted," or "in-service" states so that servicing of the deferred interrupt is delayed until a later time. In selected embodiments, the defer operation may be accomplished by encoding the DEFER command, INTAG, and LPID values in the data payload of the write operation to the interrupt controller. The interrupt controller then uses the interrupt tag and the LPID conveyed to manage the deferred interrupt independent from other interrupts. With the "deferred" state 210, all of the interrupt controller information on the deferred interrupt is left intact, but the interrupt is taken out of the presentation arbitration decision until activated by software. This allows other, lower priority, interrupts to be presented for servicing. A DEFER_ALL command allows all interrupts for a specified partition and priority level to be deferred.

When the guest OS (or hypemisor) decides to service the deferred interrupt, the interrupt may be returned to the "idle" state 202 over the "activate" transition. To this end, the processor may execute the interrupt control instruction to write the ACTIVATE command with the associated interrupt tag and LPID value to the interrupt command register 25 of the interrupt controller 14 to re-enable the interrupt for presentation. The ACTIVATE command can be targeted for a specific deferred interrupt or an ACTIVATE_ALL command can activate all deferred interrupts for a partition.

In accordance with other embodiments, the processor may use the interrupt control instruction to delay acceptance of an interrupt request by moving the interrupt to a "suspended" state 216 or "suspended-in-service" state 212 from the "idle," "pending," "asserted," or "in-service" states so that servicing of the suspended interrupt is delayed until a later time. For example, if the hypervisor decides to suspend an interrupt that is "idle" 202, "pending" 204, or "asserted" 206, the interrupt may be moved to the "suspended" state 216 over the "suspend" transition by encoding the appropriate SUSPEND command, INTAG, and LPID values in the data payload of the write operation to the interrupt controller. A "suspended" interrupt remains in the suspended state 216 until it is resumed by software. In order to resume processing of the suspended interrupt, the processor may execute the interrupt control instruction to write the RESUME command with the associated interrupt tag and LPID value to the interrupt command register 25 of the interrupt controller 14 to return the interrupt to the "idle" state 202.

The hypervisor may also decide to suspend an interrupt that is "in service" 208, in which case the interrupt may be moved to the "suspended-in-service" state 212 over the "suspend" transition, such as by encoding the appropriate SUSPEND command, INTAG, and LPID values in the data payload of the write operation to the interrupt controller. At this point, the hypervisor may decide to return the interrupt to the "in-service" state 208 by moving the interrupt over the "resume" transition back. Alternatively, when there is a race condition between a guest servicing interrupts and the hypervisor trying to suspend the guest, the guest OS may decide to defer further processing of the suspended-in-service interrupt, in which case the interrupt is moved over the "defer" transition to the "suspended-deferred" state 214.

Similarly, the hypervisor may decide to suspend an interrupt that is "deferred" 210, in which case the interrupt may be moved to the "suspended-deferred" state 214 over the "suspend" transition. Using the interrupt control instruction, the hypervisor may suspend the deferred interrupt by writing the "suspend" command with the associated interrupt tag and LPID value to the interrupt command register 25 of the interrupt controller 14. At this point, the hypervisor may decide to return the interrupt to the "deferred" state 210 by moving the interrupt over the "resume" transition back. Alternatively, when there is a race condition that arises when the guest is trying to activate the interrupt while the hypervisor it trying to suspend the guest, the hypervisor may decide to suspend further processing of the suspended-deferred interrupt, in which case the interrupt is moved over the "activate" transition to the "suspended" state 216.

Finally, the hypervisor may move an interrupt that is "in-service" 208 directly to the "suspended" state 216 over the "suspend-re-assert" transition to place the identified interrupt in a suspended state in the interrupt controller, such that it does not assert itself in the priority scheme. In the "suspended" state 216, the interrupt will re-assert when it is resumed back to the "idle" state 202. The hypervisor may use the "suspend-re-assert" transition if it does not preemptively suspend interrupts at partition switch time and an interrupt is taken in the hypervisor for the partition which is out of service, thereby assuring that the interrupt will re-assert when it is resumed, even for edge triggered interrupts. To effect a "suspend-re-assert" transition, the hypervisor may write the SUSPEND-RE-ASSERT command with the associated interrupt tag and LPID value to the interrupt command register 25 of the interrupt controller 14 so that the interrupt designated by the interrupt tag is taken out of the "in-service" state 208 and put into the "suspended" state 216. When taking an interrupt for a guest which is not in execution, the hypervisor may use the "suspend-re-assert" operation to prevent the interrupt from a guest which is not in execution from occurring, but will cause the interrupt to re-assert when the guest is brought back into execution.

When the execution of an interrupt in the "in-service" state 208 is completed, an end-of-interrupt command may be performed when the processor executes an interrupt control instruction to write the EOI command with the associated interrupt tag and LPID value to the interrupt command register 25 of the interrupt controller 14. As a result, the interrupt returns to the "idle" state 202 from the "in-service" state 208 over the end-of-interrupt "EOI" transition.

Figure 3:
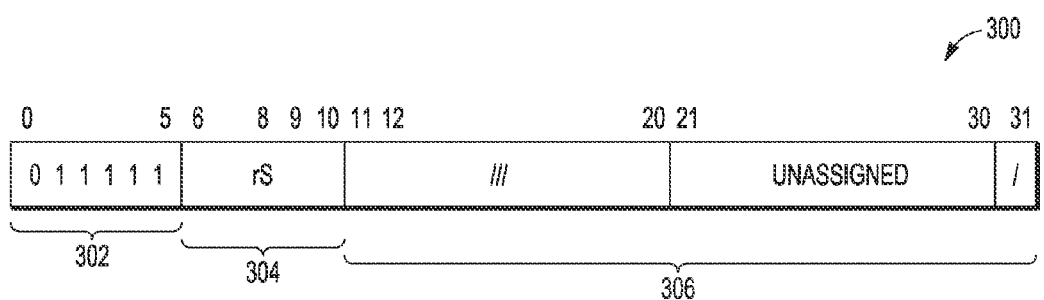
FIG. 3 depicts selected fields of an interrupt control instruction in accordance with selected embodiments of the present invention.
Figure 4:
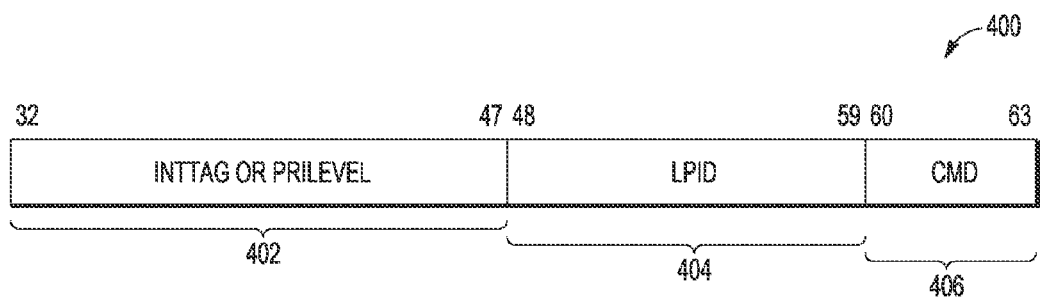
FIG. 4 depicts data format fields in a data payload in accordance with selected embodiments of the present invention.

To provide an example definition of an interrupt control instruction 47 and associated data payload 48, reference is now made to FIGS. 3-4 which depict selected instruction identifier fields 300 and data payload fields 400 of an interrupt control instruction. While it will be appreciated that any desired instruction identifier and data payload fields may be used to uniquely identify the interrupt control instruction. FIG. 3 shows an example set of instruction identifier fields 300 including a first bit field 302 (e.g., bits 0-5) which specifies an interrupt control instruction identifier, a second bit field 304 (e.g., bits 6-10) which specifies the source register (rS), and a third bit field 306 (e.g., bits 11-31) which has no assigned functionality. Likewise, FIG. 4 shows an example set of data payload fields 400, including a first bit field 402 (e.g., bits 32-47) which specifies device-specific information for the partitioned resource (e.g., an interrupt identifier or priority level value), a second bit field 404 (e.g., bits 48-59) which specifies a partition identifier for the interrupt (e.g., LPID), and a third bit field 106 (e.g., bits 60-63) which specifies a command value for the interrupt. When the interrupt control instruction 300, 400 is executed, the processor 41 identifies the interrupt control instruction based on the instruction identifier fields 300, and then provides a portal to perform word stores of the data payload fields 400 to the real address obtained from the INTCTLAR register, as illustrated with the example pseudocode set forth below:

```
raddr <-- INTCTLAR
if MSR[GS] = 0 then // if executed by hypervisor
    data <-- (rS)_{32:63}
else
    data <-- (rS)_{32:47} || LPIDR_{52:63} || (rS)_{60:62} || 0b0
REAL_MEM(raddr, 4) <-- data.
```

With the depicted pseudocode, a data store operation to the interrupt controller 14 is specified for storing the encoded data payload (data) as four bytes of information at the real address (raddr) using the store operation (REAL_MEM). If the interrupt control instruction is executed in the hypervisor state (e.g., MSR[GS]=0b0), then the word stored at address (raddr) can be any data encoded into the data payload (data) that specified by the hypervisor (e.g., bits 32:63 of the source register rS). However, if the interrupt control instruction is executed in the guest supervisor state, (e.g., MSR[GS] 0b1), then the encoded data payload word (data) stored at address (raddr) is a predetermined concatenation of device-specific information 402, partition identification information 404, and command information 406. In an example embodiment, the device-specific information 102 is encoded with the upper 16 bits of the lower word of rS to convey an interrupt identifier (e.g., INTTAG) or interrupt priority level (PRILEVEL). In addition, the partition identification information 404 is encoded with the LPID copied from the LPIDR. Finally, the command information 406 is encoded with bits 60:62 of rS (identifying the command) and one "0" bit (indicating if this is a hypervisor command). When in the guest supervisor state, the low order bit from the third CMD field 406 is cleared so that the low order bit for the CMD field is reserved for hypervisor-only commands. As a result, the operating systems should not use commands. Which have the low order bit set even in bare metal execution as these commands are reserved for specific hypervisor actions and not available when the operating system is executing as a guest. Other bits of the third CMD field 406 may be used to specify different operations to be performed by the operating systems and hypervisors. For example, if CMD=0000, this may specify an end-of-interrupt (EOI) command so that the interrupt identified by the associated INTTAG and qualified against the LPID value is taken out of service and its state in the interrupt controller goes to "idle." Performing an EOI command to an interrupt that is not in the in-service state or does not pass the LPID qualification check is ignored by the interrupt controller. If the supplied LPID is 0 (or any other predetermined value indicating the hypervisor), the LPID match is ignored and only the INTTAG is used. Upon execution of an interrupt control instruction with the EOI command, the processor sends a memory mapped write to the address specified in the INTCTLAR register for the command register 25 in the interrupt controller, where the write operation has a data payload encoded with the INTTAG value and LPID from the LPIDR register 45 that is attached to the outbound write transaction by hardware. The stored data causes the interrupt controller to take the interrupt identified by INTTAG value and qualified by LPID value to be taken out of service and transitioned to the "idle" state. If the supplied LPID=0, the LIPID match is ignored (assuming that LPID=0 is the hypervisor).

In another example command for the guest supervisor state, a predetermined CMD value (e.g., CMD=0010) may specify a DEFER command so that the interrupt identified by the associated INTTAG and LPID values is taken out of its current state and its state in the interrupt controller goes to "deferred." If the supplied LPID is 0, the LPID match is ignored and only the INTTAG is used.

In another example command for the guest supervisor state, a predetermined CMD value (e.g., CMD=0100) may specify an ACTIVATE command that is provided so that an interrupt identified by the associated INTTAG and LPID values is taken out of the deferred state and its state in the interrupt controller goes to "idle." If the supplied LPID is 0, the LPID match is ignored and only the INTTAG is used.

When the host supervisor state is indicated (e.g., the low order bit from the third CMD field 406=1), the remaining bits may be used to specify different operations to be performed only by the hypervisor. For example, a predetermined CMD value (e.g., CMD=0111) may specify a SUSPEND command no that the interrupt identified by the associated INTTAG and LPID values is taken out of its current state and its state in the interrupt controller goes to one of the "suspended," "suspended-in-service," or "suspended-deferred" states, depending on the origin state. Another predetermined CMD value (e.g., CMD=1001) may specify a RESUME command no that the interrupt identified by the associated INTTAG and LPID values is taken out of its current "suspended" state and its state in the interrupt controller goes to one of the "idle," "deferred," or "in-service" states, depending on the origin state.

As will be appreciated, other CMD values can be used to convey other interrupt state transitions. For example, a predetermined CMD value (e.g., CMD=0011) may be used to specify a DEFER_ALL command whereby all interrupts with a priority level equal or lower than a specified priority level (PRILEVEL) which have a matching LPID are taken out of their current state and their state in the interrupt controller goes to "deferred." If the supplied LPID is 0, the LPID match is ignored and all interrupts with a priority level equal or lower than PRILEVEL are deferred. In another example command for the host supervisor state, a predetermined CMD value CMD=0101) may be used as an ACTIVATE_ALL command so that all interrupts which have a matching LPID are taken out of the "deferred" state and their state in the interrupt controller goes to "idle." If the supplied LPID is 0, the LPID match is ignored and all interrupts are activated.

Figure 5:
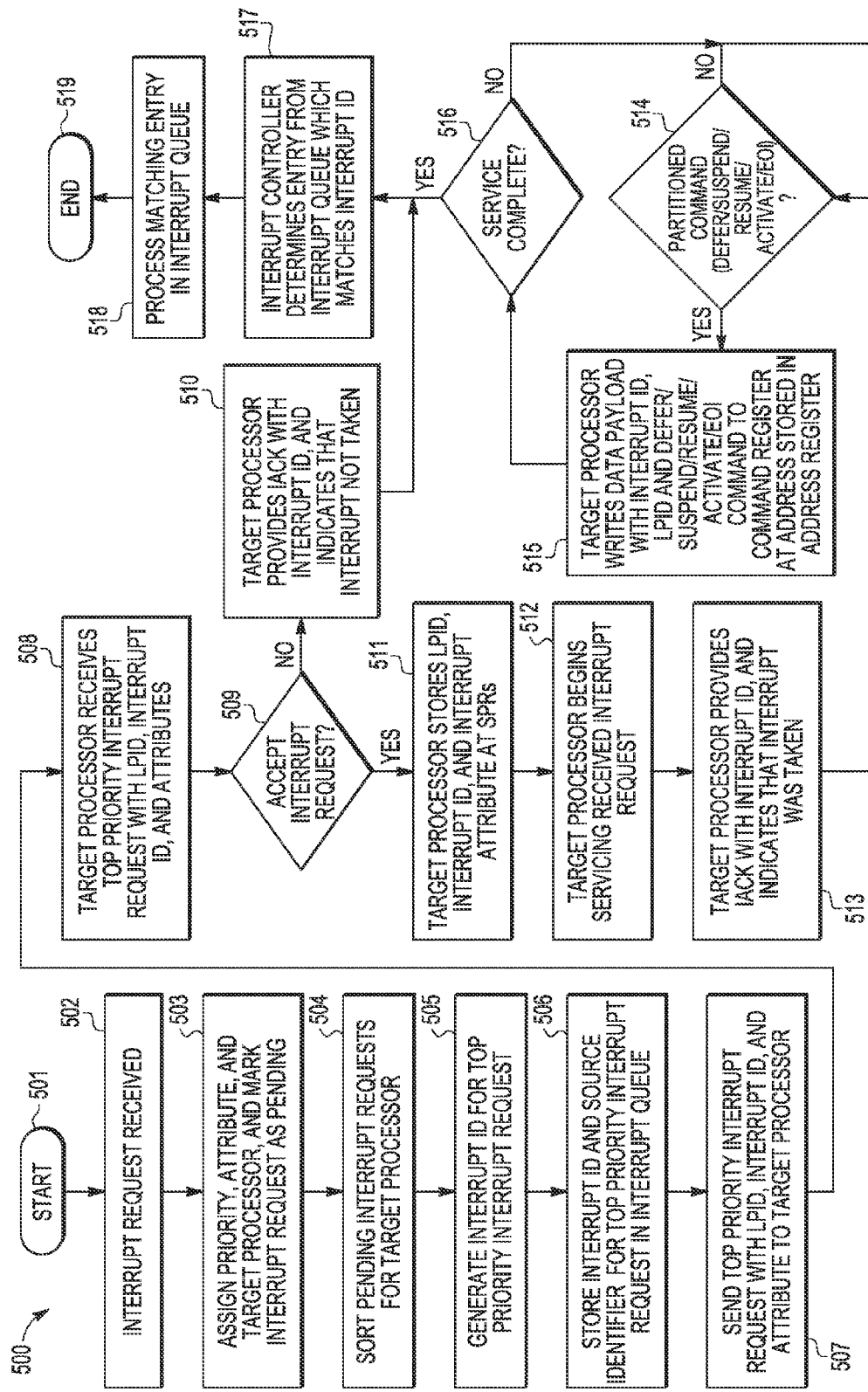
FIG. 5 depicts an example flow diagram according to a method for processing a virtualized interrupt at an interrupt controller and target processor in accordance with selected embodiments of the present invention.

Referring now to FIG. 5, there is depicted an example flow diagram 500 of a method for processing an interrupt at a partitioned interrupt controller and target processor in accordance with selected interrupt controller embodiments of the present invention. Once the method starts at step 501, an interrupt request is received at step 502. The interrupt request may be received from one or more interrupt sources coupled to an interrupt controller 14, where the interrupt sources may be internal or external to the data processing system 10.

At step 503, the interrupt controller responds to a received interrupt request by assigning interrupt controller information to the interrupt request and marking the interrupt request state as "pending." The assigned interrupt controller information may include an interrupt priority value, various interrupt attributes, and interrupt source identifier, along with the target processor and any state information associated with the interrupt request. As will be appreciated, each interrupt source may be assigned a corresponding priority, attributes, partition, and target processor, though different interrupt sources may share a same priority, attributes, partition, and/or target processor (which refers to the processor that is intended to service the interrupt). The state information may include one or more indicators to indicate various states of the interrupt (e.g., pending, asserted, in service, invalid, deferred, suspended, suspended-in-service, suspended-deferred, etc.). In addition, partition information LPID) is assigned or associated with each interrupt request.

At step 504, the pending interrupt requests for each target processor are sorted. The interrupt controller may include sorting circuitry for determining which processor is the target processor for the interrupt request and sorting the interrupt requests for each target processor. The interrupt requests may be sorted by way of priority, age, interrupt type, etc., or any combination thereof. To permit one or more interrupts to be delayed for processed at a later time, the interrupt controller includes a "deferred" state and/or one or more "suspended" states for each pending interrupt request that is identified with an interrupt tagging or identifier mechanism (e.g., INTTAG). Thus, the sorting circuitry is operative to leave intact all of interrupt controller information for any identified interrupt(s) in the "deferred" or "suspended" states, but to otherwise take the identified interrupt(s) out of the presentation arbitration decision. This allows other, lower priority, interrupts to be presented for servicing.

Once a top interrupt request has been determined, an interrupt identifier, or ID, corresponding to that particular interrupt is generated at step 505. The interrupt identifier or tag may be generated in any desired manner, and can be any value that uniquely identifies the interrupt request. Once the interrupt associated with a corresponding interrupt identifier has been serviced, the value of that interrupt identifier can be used again for a new and completely unrelated interrupt, if desired. The value of the interrupt identifier may have a particular significance (e.g., interrupt source number, etc.) or may be unrelated to the interrupt itself.

At step 506, the interrupt ID for the top priority interrupt request is sent to an outstanding interrupt request queue or similar structure to be remembered along with the interrupt source identifier. In addition, the top priority interrupt request is sent to the target processor at step 507, along with the associated partition ID (LPID), interrupt ID, and interrupt attributes. In the example shown in FIG. 1, the interrupt controller 14 provides the top priority interrupt request through the interrupt request 30, the interrupt identifier 31, and interrupt attributes 32 to processor 41. Other embodiments may provide this information using any desired and appropriate signaling scheme (e.g., some of this information may be provided serially, in parallel, may be time multiplexed, etc.).

Once an interrupt request and associated LPID, interrupt ID, and attributes are received at the target processor (step 508), the processor determines whether or not to accept the received interrupt request at decision step 509. Any desired criteria may be used to determine whether or not to accept the received interrupt request. For example, software and/or hardware masking of interrupts may be used in the processor. In addition or in the alternative, the decision to accept or reject an interrupt may be deferred or suspended until there is a change in one or more mask values to allow acceptance of the interrupt, or until a new interrupt request is received. If an original interrupt request has not yet been accepted when anew interrupt request is received, then the processor will reject the original interrupt request in favor of the new interrupt request since anew interrupt request will only be sent to the processor if that new interrupt request was determined by sorting circuitry to be of higher priority.

If the interrupt request is not accepted (negative outcome to decision 509), the target processor provides an interrupt acknowledge (JACK) message and an interrupt identifier to the interrupt controller to indicate that the requested interrupt was not taken at step 510. At the interrupt controller, the interrupt identifier may be used to identify the matching entry in the outstanding interrupt request queue (step 517) and then remove the matching entry from the queue (step 518) before the sequence ends (at step 519). At this point, the interrupt has been delivered to target processor, the target processor is not servicing the interrupt, and the interrupt remains in the "pending" state in the interrupt controller so that it can again be selected for presentation to the processor.

If the interrupt request is accepted by the target processor (affirmative outcome to decision 509), the target processor stores the partition ID (LPID), interrupt ID, and interrupt attributes in memory (e.g., special purpose registers) for further processing at step 511. In particular, the received partition ID (LPID) may be stored and compared with the LPID value stored in LPID register (LPIDR) for purposes of steering the interrupt request to the guest or hypervisor, and the interrupt ID and interrupt attributes may be stored for use in processing the interrupt request. At step 512, the target processor begins servicing the received interrupt request. As will be appreciated, the servicing of an interrupt request may be performed in any desired and appropriate manner.

As an initial step 513 in the interrupt servicing, the target processor provides an interrupt acknowledge (IACK) and an interrupt identifier, and asserts an interrupt taken/not taken indicator to indicate that the interrupt was taken. The interrupt controller uses the interrupt identifier to select the corresponding entry in the outstanding interrupt request queue and then updates the state information for the corresponding interrupt source identifier to change the state of the interrupt request from the "pending" to the "in-service" state.

During servicing of the interrupt request, the target processor may issue a partitioned command to the interrupt controller by executing an interrupt control instruction which performs a specialized store of the partitioned command, such as an EOI (end-of-interrupt) instruction, a "defer" instruction, an "activate" instruction, a "suspend" instruction, a "resume" instruction, or the like. At a minimum, an EOI command is generated when the target processor completes servicing of the requested interrupt. Once the control instruction for the partitioned command is executed (affirmative outcome to decision 514), the target processor writes the partitioned command and associated LIPD (and any interrupt ID) to the data payload which is securely stored to an interrupt controller command register having an address which is stored in a dedicated address register at step 515. As described herein, the interrupt controller uses the received LPID to qualify any received command against the configured LPID for the identified interrupt. In addition, the processor may issue a DEFER_ALL command to allow all interrupts for a specified partition and priority level to be deferred. In addition, an ACTIVATE command may be issued for each pending deferred interrupt request that is identified with an interrupt tagging or identifier mechanism (e.g., INTTAG). To enable activation of deferred interrupts, the sorting circuitry is operative to retrieve the interrupt controller information for any identified interrupt(s) in the "deferred" state and re-enable the identified interrupt(s) for inclusion in the presentation arbitration decision. The ACTIVATE command can be targeted for a specific deferred interrupt or can activate all deferred interrupts for a partition. In this way, the interrupt controller can independently manage the interrupts using the "defer" and "activate" states and the interrupt tagging mechanism (rather than the legacy stack-based mechanism). In similar fashion, the interrupt controller processes SUSPEND and RESUME commands issued by the hypervisor OS using sorting circuitry that is operative to suspend and resume any identified interrupt(s) in the presentation arbitration decision.

For so long as the interrupt is active and being serviced (negative outcome to decision 516), the target processor may issue any partitioned command (step 514) as an encoded data payload store to the interrupt controller (step 515). As described herein, the data payload for an specified interrupt may include an interrupt identifier (INTTAG), partition parameter (LPID), and associated command (CMD), such as a defer, resume, suspend, activate, or suspend-re-assert command. However, once the target processor completes servicing of the interrupt (positive outcome to decision 516), the partitioned EOI indication sent to the interrupt controller is processed by using the interrupt identifier to identify the matching entry in the outstanding interrupt request queue (step 517) and then remove the matching entry from the queue (step 518) before the sequence ends (at step 519) with the interrupt state machine being returned to the "idle" state as shown in FIG. 2.

As will be appreciated, the hardware managed interrupt service structure and programming model disclosed herein provide a secure and efficient mechanism for deferring or suspending processing of virtual interrupt requests. In selected embodiments, the hardware managed interrupt service mechanism for delaying interrupt processing may be embodied in hardware, in processing circuitry for executing software (e.g., including but not limited to firmware, resident software, microcode, etc.), or in some combination thereof. Furthermore, the hardware managed interrupt service mechanism may be embodied as a computer program product accessible from a computer-usable or computer-readable medium providing program code for use by or in connection with a computer or any instruction execution system, where a computer-usable or computer readable medium can be any apparatus that may include or store the program for use by or in connection with the instruction execution system, apparatus, or device. Examples of a non-transitory computer-readable medium include a semiconductor or solid state memory, magnetic tape, a removable computer diskette, a random access memory (RAM), a read-only memory (ROM), a rigid magnetic disk and an optical disk, such as a compact disk-read only memory (CD-ROM), compact disk-read/write (CD-R/W) and DVD. In addition, the non-transitory computer readable storage medium described herein may store a first interrupt control instruction which, upon execution, causes the processor to store a partitioned delay command at a partitioned interrupt controller by performing a non-exclusive sequence of actions. The hardware managed interrupt service mechanism described herein may be part of the design for an integrated circuit chip which controls the fabrication of chips or the photolithographic masks used to fabricate chips by defining design rules for fabricating integrated circuit chips from a semiconductor wafer into final packaged form.

By now it should be appreciated that there has been provided a circuit, method and system for managing interrupts at a partitioned interrupt controller, where the interrupts may be received from one or more virtualized hardware resources. In selected embodiments, the partitioned interrupt controller processes interrupts with one or more interrupt run-time operations defined by one or more normal operation interrupt processing states in a normal mode of operation. The normal operation interrupt processing states may include an idle state (for an interrupt that is idle), a pending state (for an interrupt that is asserting for selection by the processor), an asserted state (for an interrupt having the highest priority bound for the processor), and/or an in-service state (for an interrupt that has been taken by the processor). In a delayed mode of operation, the partitioned interrupt controller transfers a first interrupt designated by an interrupt identifier and partition parameter from a first normal operation interrupt processing state to a delayed state under control of an operating system executing on a processor to remove the first interrupt from a presentation arbitration performed by the partitioned interrupt controller while interrupt controller information for the first interrupt otherwise remains at the partitioned interrupt controller. In selected embodiments, the first interrupt may be transferred from a normal operation interrupt processing state to a deferred state under control of a guest operating system, in which case the first interrupt designated may subsequently be transferred from the deferred state to one the normal operation interrupt processing states with an activate command issued by the guest operating system. From the deferred state, the first interrupt may then be transferred to a suspended-deferred state with a suspend command issued by the trusted hypervisor or higher-level operating system. And from the suspended-deferred state, the first interrupt designated may be transferred to a suspended state with an activate command issued by the trusted hypervisor. In other embodiments, the first interrupt may be transferred from a normal operation interrupt processing state to a suspended state under control of the trusted hypervisor, in which case the first interrupt designated may subsequently be transferred from the suspended state to one the normal operation interrupt processing states with a resume command issued by the trusted hypervisor. For example, the first interrupt may be transferred from an idle state, a pending state, or an asserted state to the suspended state in response to a suspend command. Alternatively, the first interrupt may be transferred from an in-service state to a suspended-in-service state in response to a suspend command, and from there may be transferred to a suspended-deferred state under control of a defer command issued by the guest operating system. Alternatively, the first interrupt may be transferred from an in-service state to a suspended state in response to a suspend-re-assert command issued by the trusted hypervisor. In selected embodiments, interrupts are transferred to a delay state by storing a data payload (having a delay command, interrupt identifier, and associated partition parameter retrieved from a first hardware register at the processor to a predetermined storage location at the partitioned interrupt controller; retrieving the delay command, interrupt identifier, and associated partition parameter from the predetermined storage location at the partitioned interrupt controller; and processing the delay command and associated partition parameter at the partitioned interrupt controller to transfer at least the first interrupt request designated by the interrupt identifier and associated partition parameter from the first normal operation interrupt processing state to the delayed state of operation at the partitioned interrupt controller. The data payload may be stored with a memory mapped write to a command register at the partitioned interrupt controller using storage address retrieved from a dedicated address register in the processor.

In another form, there is provided a circuit, method and system for processing interrupts in a data processing system having a processor and an interrupt controller. As disclosed, the interrupt controller processes a first plurality of partitioned interrupt requests to identify and present a first prioritized partitioned interrupt request to the processor. This processing may include receiving interrupt requests from one or more interrupt sources, assigning an interrupt identifier, interrupt attribute, and partition parameter to each received interrupt request, and setting a state of each received interrupt request to "pending." Subsequently, the interrupt controller receives an interrupt delay request for one or more interrupt requests that are to be deferred for subsequent processing by the processor, where the interrupt delay request includes a partition parameter. In selected embodiments, the received interrupt delay request may include an interrupt identifier, partition parameter and a DEFER command (to defer processing of a first interrupt request identified by the interrupt identifier) from a guest OS executing at the processor which are received as a memory mapped write to a command register at the interrupt controller using a physical address retrieved from a dedicated address register in the processor. In other embodiments, the received interrupt delay request may include a priority level, partition parameter and SUSPEND command from a trusted higher-level OS to defer processing of an interrupt request identified by the interrupt identifier. In response to the interrupt delay request, the interrupt controller removes the identified interrupt requests from the first plurality of partitioned interrupt requests to define a first set of partitioned interrupt requests which are then processed at the interrupt controller to identify and present a second prioritized partitioned interrupt request to the processor. The removal of the interrupt requests may be accomplished by setting a state of the first interrupt request to "deferred" or "suspended" so that the processing of the first set of partitioned interrupt requests processes only partitioned interrupt requests having a "pending" state. In addition, the interrupt controller may subsequently receive an interrupt activate request which includes a partition parameter for one or more identified interrupt requests that are to be activated for subsequent processing by the interrupt controller. In response to the activate request, the interrupt controller re-enables the one or more identified interrupt requests for processing by the interrupt controller to define a second set of partitioned interrupt requests, and then processes the second set of partitioned interrupt requests at the interrupt controller to identify and present a third prioritized partitioned interrupt request to the processor.

Although the described exemplary embodiments disclosed herein are directed to methods and systems for managing system resources in a partitioned/virtualized machine using virtualized instructions, the present invention is not necessarily limited to the example embodiments illustrate herein, and various embodiments of the device control circuitry and methods disclosed herein may be implemented with other circuit components. For example, while selected embodiments are described which use interrupt control instructions to convey delay commands via a secure storage operation to a command register, other instruction mechanisms may be used, such as providing address based portals in the interrupt controller that define the command to be carried out. For example, a write operation to a first predetermined address (e.g., 0xXYZ) in the interrupt controller conveys an EOI for the identified interrupt, while a write operation to a second predetermined address (e.g., 0xXYZ+4) conveys a DEFER command, etc. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "by," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus

What is claimed is:
1. A method of managing interrupts at a partitioned interrupt controller, comprising:
    processing one or more interrupts with one or more interrupt run-time operations defined by one or more normal operation interrupt processing states at a partitioned interrupt controller in a normal mode of operation; and transferring a first interrupt designated by an interrupt identifier and partition parameter from a first normal operation interrupt processing state to one of a plurality of delayed states of operation at the partitioned interrupt controller under control of an operating system executing on a processor to remove the first interrupt from a presentation arbitration performed by the partitioned interrupt controller while interrupt controller information for the first interrupt otherwise remains at the partitioned interrupt controller.

2. The method of claim 1, where the partitioned interrupt controller processes interrupts received from one or more virtualized hardware resources.

3. The method of claim 1, where transferring the first interrupt from the first normal operation interrupt processing state comprises transferring the first interrupt to a delayed state that is a deferred state under control of a guest operating system.

4. The method of claim 3, further comprising transferring the first interrupt designated by the interrupt identifier and partition parameter from the deferred state to one of the normal operation interrupt processing states with an activate command issued by the guest operating system.

5. The method of claim 1, where transferring the first interrupt from the first normal operation interrupt processing state to one of the plurality of delayed states comprises transferring the first interrupt from the first normal operation interrupt processing state to a delayed state that is a suspended state under control of a trusted hypervisor.

6. The method of claim 5, further comprising transferring the first interrupt designated by the interrupt identifier and partition parameter from the suspended state to one of the normal operation interrupt processing states with a resume command issued by the trusted hypervisor.

7. The method of claim 5, where transferring the first interrupt from the first normal operation interrupt processing state to the delayed state that is the suspended state comprises transferring the first interrupt from an idle state for an interrupt that is idle, a pending state for an interrupt that is asserting for selection by the processor, or an asserted state for an interrupt having the highest priority bound for the processor, to the suspended state.

8. The method of claim 5, where transferring the first interrupt from the first normal operation interrupt processing state to the delayed state that is the suspended state comprises transferring the first interrupt from an in-service state for an interrupt that has been taken by the processor to a suspended-in-service state.

9. The method of claim 8, further comprising transferring the first interrupt from the suspended-in-service state to a suspended-deferred state under control of a guest operating system.

10. The method of claim 5, where transferring the first interrupt from the first normal operation interrupt processing state to the delayed state that is the suspended state comprises transferring the first interrupt from an in-service state for an interrupt that has been taken by the processor to a suspended state under control of a trusted hypervisor.

11. The method of claim 3, further comprising transferring the first interrupt designated by the interrupt identifier and partition parameter from the deferred state to a suspended-deferred state with a suspend command issued by the trusted hypervisor.

12. The method of claim 11, further comprising transferring the first interrupt designated by the interrupt identifier and partition parameter from the suspended-deferred state to a suspended state with an activate command issued by the trusted hypervisor.

13. The method of claim 1, where transferring the first interrupt from the first normal operation interrupt processing state comprises:

storing a first data payload at a predetermined storage location at the partitioned interrupt controller, where the first data payload comprises a delay command for at least a first interrupt request, an interrupt identifier, and an associated partition parameter retrieved from a first hardware register at the processor;

retrieving the delay command, interrupt identifier, and associated partition parameter from the predetermined storage location at the partitioned interrupt controller; and processing the delay command and associated partition parameter at the partitioned interrupt controller to transfer at least the first interrupt request designated by the interrupt identifier and associated partition parameter from the first normal operation interrupt processing state to one of the plurality of delayed states of operation at the partitioned interrupt controller.

14. The method of claim 13, where storing the first data payload comprises a memory mapped write to a command register at the partitioned interrupt controller using storage address retrieved from a dedicated address register by the processor.

15. In a data processing system comprising a processor and an interrupt controller, a method comprising:

processing a first plurality of partitioned interrupt requests at the interrupt controller to identify and present a first prioritized partitioned interrupt request to the processor;

receiving an interrupt delay request at the interrupt controller comprising a partition parameter for one or more interrupt requests that are to be delayed to one of a plurality of delayed states of operation at the interrupt controller for subsequent processing by the processor;

removing the one or more interrupt requests from the first plurality of partitioned interrupt requests to define a first set of partitioned interrupt requests; and processing the first set of partitioned interrupt requests at the interrupt controller to identify and present a second prioritized partitioned interrupt request to the processor.

16. The method of claim 15, where processing the first plurality of partitioned interrupt requests comprises:

receiving a plurality of interrupt requests from one or more interrupt sources;

assigning an interrupt identifier and partition parameter to each received interrupt request; and setting a state of each received interrupt request to pending.

17. The method of claim 15, where receiving the interrupt delay request comprises receiving at the interrupt controller an interrupt identifier, partition parameter, and a DEFER command from a guest operating system executing at the processor to defer processing of a first interrupt request identified by the interrupt identifier.

18. The method of claim 15, where receiving the interrupt delay request comprises receiving at the interrupt controller an interrupt identifier, partition parameter, and a SUSPEND command from a trusted hypervisor executing at the processor to suspend processing of a first interrupt request identified by the interrupt identifier.

19. The method of claim 15, where removing the one or more interrupt requests comprises setting a state of the first interrupt request to deferred or suspended.

20. The method of claim 19, where processing the first set of partitioned interrupt requests comprises processing only partitioned interrupt requests having a pending state.

21. The method of claim 15, further comprising:
- receiving an interrupt activate request at the interrupt controller comprising a partition parameter for one or more identified interrupt requests that are to be activated for subsequent processing by the interrupt controller;
- re-enabling the one or more identified interrupt requests for processing by the interrupt controller to define a second set of partitioned interrupt requests; and
- processing the second set of partitioned interrupt requests at the interrupt controller to identify and present a third prioritized partitioned interrupt request to the processor.

* * * * *